United States Patent
Huang

(10) Patent No.: US 7,739,734 B2
(45) Date of Patent: Jun. 15, 2010

(54) SYSTEM AND METHOD FOR PROTECTING A BIOS FROM UNAUTHORIZED MODIFICATIONS

(75) Inventor: Kuei-Ping Huang, Guangdong (CN)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 1013 days.

(21) Appl. No.: 11/309,172

(22) Filed: Jul. 6, 2006

(65) Prior Publication Data

US 2007/0074285 A1   Mar. 29, 2007

(30) Foreign Application Priority Data

Jul. 27, 2005   (CN) .................. 2005 1 0036253

(51) Int. Cl.
G06F 7/04 (2006.01)
G06F 12/00 (2006.01)
G06F 12/14 (2006.01)
G06F 13/00 (2006.01)
G06F 17/30 (2006.01)
G11C 7/00 (2006.01)
G06F 11/30 (2006.01)

(52) U.S. Cl. ............... 726/19; 726/17; 726/18; 726/23; 726/28; 713/189

(58) Field of Classification Search ............ 726/17–19, 726/23, 28; 713/189
See application file for complete search history.

(56) References Cited

U.S. PATENT DOCUMENTS

| 5,657,470 | A | 8/1997 | Fisherman et al. |
| 6,067,625 | A * | 5/2000 | Ryu .................... 726/18 |
| 6,460,139 | B1 * | 10/2002 | Heinrich et al. ........ 726/18 |
| 6,647,498 | B1 * | 11/2003 | Cho .................... 726/17 |
| 2003/0070102 | A1 * | 4/2003 | Kondo ................. 713/202 |
| 2004/0111633 | A1 * | 6/2004 | Chang ................. 713/200 |
| 2005/0033970 | A1 * | 2/2005 | Anson et al. .......... 713/189 |
| 2007/0005951 | A1 * | 1/2007 | Davis et al. ........... 713/2 |

FOREIGN PATENT DOCUMENTS

| TW | 394897 | 6/2000 |
| TW | 516000 | 1/2003 |

* cited by examiner

Primary Examiner—Shin-Hon Chen
(74) Attorney, Agent, or Firm—Winston Hsu

(57) ABSTRACT

A method for protecting a BIOS from unauthorized modifications includes the steps of: providing a password storing region (122) configured for storing a first password of the BIOS; copying the first password from the password storing region into a CMOS RAM (10); determining whether the first password of the BIOS needs to be changed; receiving and verifying a verifying password inputted by a user with the first password for preventing an unauthorized user to change the first password if the first password needs to be changed; setting a new password of the BIOS if the verifying password is valid, and storing the new password into the CMOS RAM; copying the new password from the CMOS RAM into the password storing region. A system for protecting a BIOS from unauthorized modifications is also disclosed.

5 Claims, 3 Drawing Sheets

SYSTEM AND METHOD FOR PROTECTING A BIOS FROM UNAUTHORIZED MODIFICATIONS

FIELD OF THE INVENTION

The present invention generally relates to systems and methods for protecting a computer, and more particularly to a system and method for protecting a basic input output system (BIOS) from unauthorized modifications.

DESCRIPTION OF RELATED ART

A BIOS of a conventional personal computer (PC) typically includes a power-on self-test (POST) program to initialize components of the PC and a basic input/output program to connect a keyboard, a mouse, and other peripherals. The basic input/output program includes a configuration routine that permits a user to select an order in which potential boot devices are searched by the BIOS during startup of an operating system (OS), as well as an OS loader routine that loads the OS from the boot device.

Due to security concerns, some PCs implement a password protection for the BIOS configuration routine so that an unauthorized user cannot change the order in which devices are searched by the BIOS for an appropriate OS. Thus, if the appropriate OS is loaded in a hard disk drive, the unauthorized user cannot boot the PC from a floppy disk or a CD-ROM. The security of a PC may alternatively or additionally be enhanced, as discussed above, by requiring a user to enter a password for the BIOS configuration before certain classes of devices can be searched as the boot device.

It is recognized that the password for the BIOS configuration routine is stored in a complementary metal-oxide-semiconductor transistor random access memory (CMOS RAM) that requires a real time clock battery (RTC battery) to provide electric power. If there is something wrong with the RTC battery such that no electric power is supplied to the CMOS RAM, data stored in the CMOS RAM is lost, and the password protection for the BIOS configuration routine becomes disabled. Thus, increasing the potential risk of unauthorized changing the order in which devices are searched by the BIOS for an appropriate OS.

What is needed, therefore, is a system and method that protects a BIOS from unauthorized entries.

SUMMARY OF INVENTION

A system for protecting a basic input output system (BIOS) from unauthorized modifications in accordance with a preferred embodiment includes a complementary metal-oxide-semiconductor transistor random access memory (CMOS RAM), a BIOS storing region and a password storing region. The CMOS RAM is configured for storing a password of the BIOS. The BIOS storing region is configured for storing the BIOS codes and a password protecting program. The password storing region is configured for storing the password of the BIOS. The password protecting program includes an input/output module, a determining module, a comparison module, and a setting module. The input/output module is configured for copying a first password of the BIOS from the password storing region into the CMOS RAM, and a new password of the BIOS from the CMOS RAM into the password storing region. The determining module is configured for receiving a first instruction that determines whether the first password of the BIOS needs to be changed, and receiving a second instruction that determines whether to enable a password verifying mode in which a verifying password is verified by the first password. The comparison module is configured for receiving a verifying password inputted by a user, comparing the first password with the verifying password, and returning a comparison result. The setting module is configured for setting the new password of the BIOS.

A method for protecting a BIOS from unauthorized modifications in accordance with a preferred embodiment includes the steps of: providing a password storing region configured for storing a first password of the BIOS; copying the first password from the password storing region into a CMOS RAM; determining whether the first password of the BIOS needs to be changed; receiving and verifying a verifying password inputted by a user with the first password for preventing an unauthorized user to change the first password if the first password needs to be changed; setting a new password of the BIOS if the verifying password is valid, and storing the new password into the CMOS RAM; copying the new password from the CMOS RAM into the password storing region.

Other advantages and novel features of the present invention will become more apparent from the following detailed description of preferred embodiments when taken in conjunction with the accompanying drawings.

DETAILED DESCRIPTION

Figure 1:
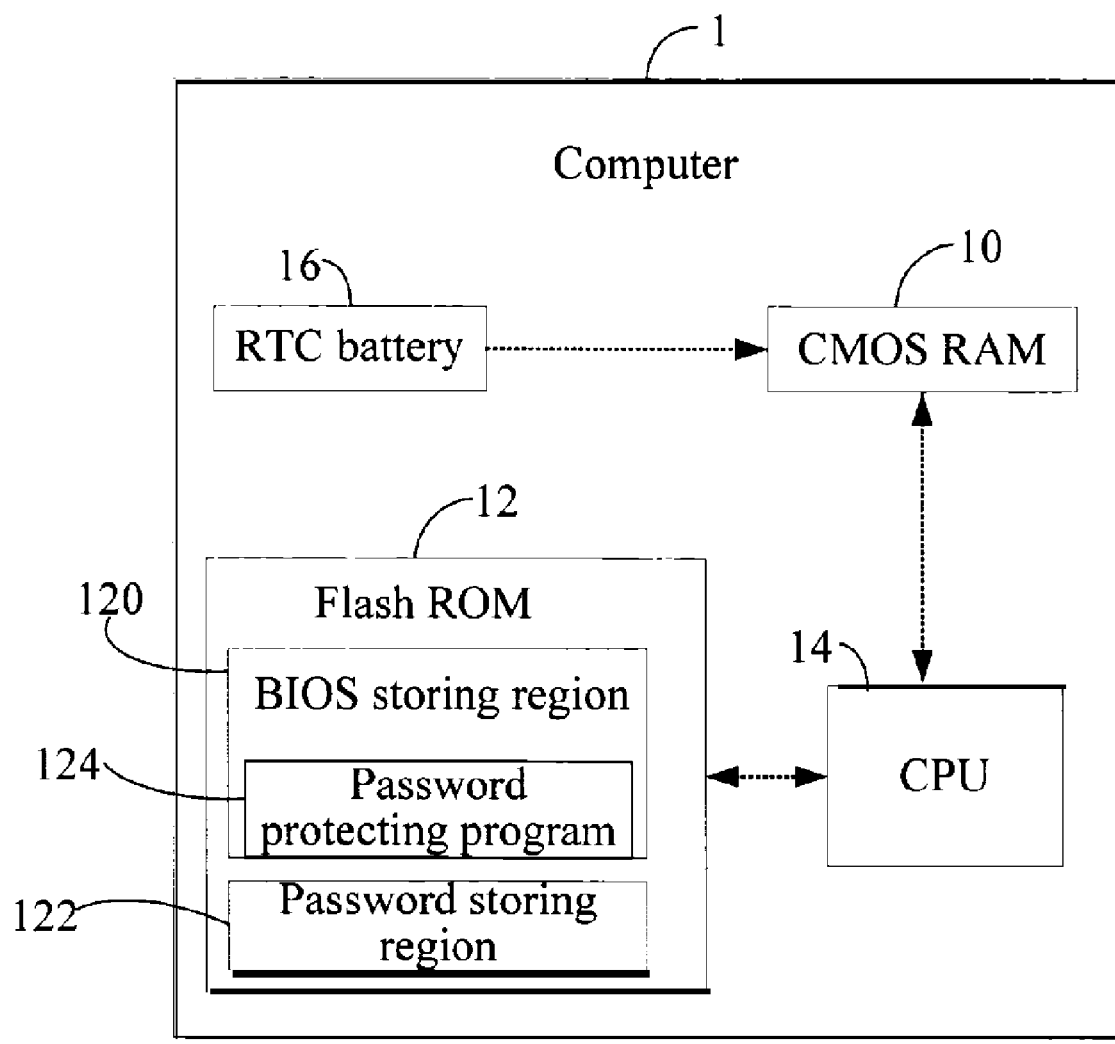
FIG. 1 is a schematic diagram of hardware configuration of a system for protecting a BIOS from unauthorized modifications in accordance with a preferred embodiment.

FIG. 1 is a schematic diagram of hardware configuration of a system for protecting a basic input output system (BIOS) from unauthorized modifications (hereinafter, "the system") in accordance with a preferred embodiment. The system is implemented in a computer 1. The computer 1 typically includes a complementary metal-oxide-semiconductor transistor random access memory (CMOS RAM) 10, a real time clock (RTC) battery 16, a central processing unit (CPU) 14, and a flash read only memory (flash ROM) 12. The flash ROM 12 includes a BIOS storing region 120 and a password storing region 122. The CMOS RAM 10 is configured for storing a password of a BIOS temporarily. The RTC battery 16 is configured for providing electric power to the CMOS RAM 10. The CPU 14 is configured for executing computer instructions. The BIOS storing region 120 is configured for storing the BIOS codes and a password protecting program 124. The password storing region 122 is configured for storing the password of the BIOS.

Figure 2:
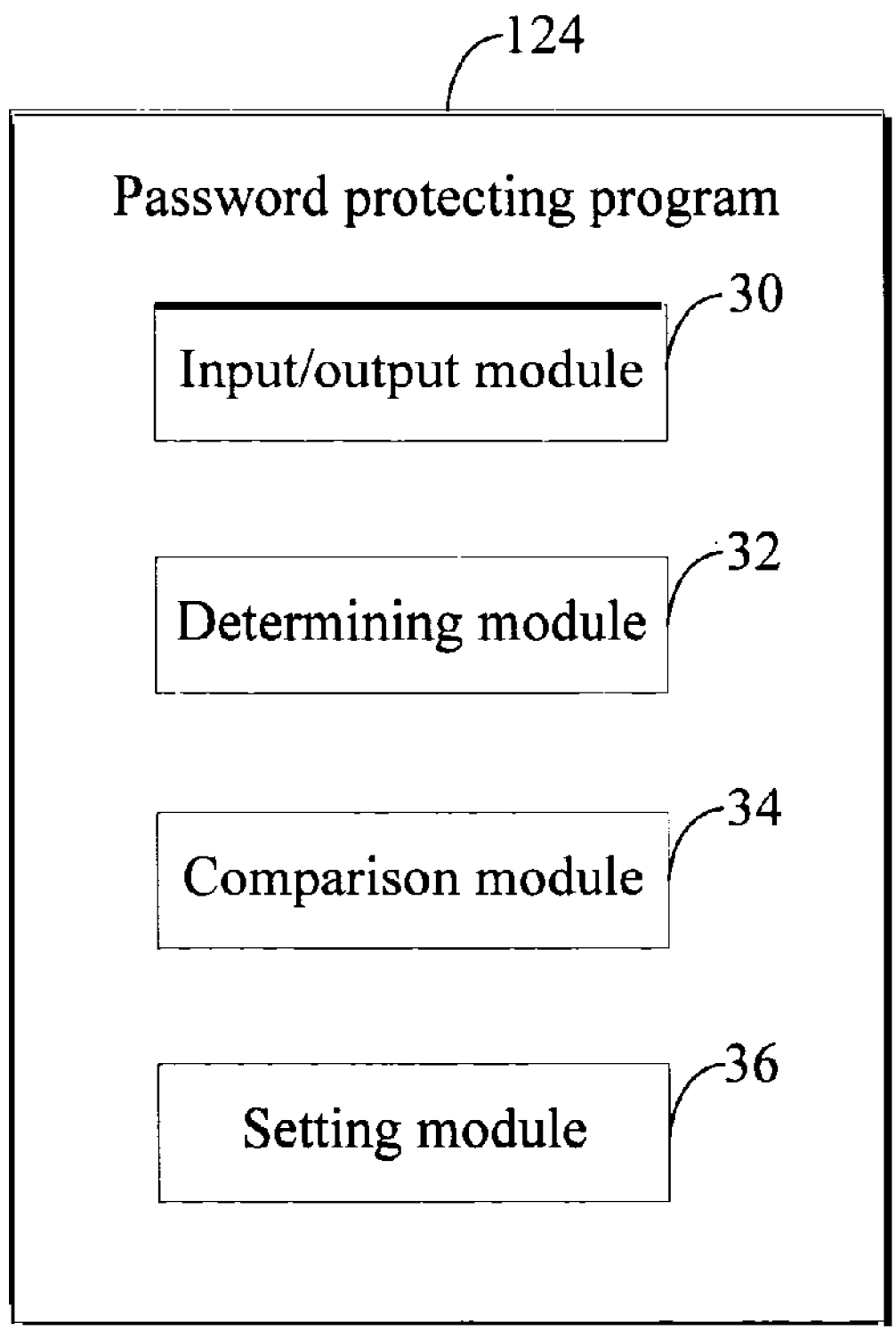
FIG. 2 is a schematic diagram of main function modules of a password protecting program of FIG. 1.

FIG. 2 is a schematic diagram of main function modules of the password protecting program 124. The password protecting program 124 typically includes an input/output module 30, a determining module 32, a comparison module 34, and a setting module 36.

The input/output module 30 is configured for copying a current password of the BIOS from the password storing region 122 into the CMOS RAM 10 when CPU 14 of the computer 1 invokes and executes startup codes stored in the BIOS storing region 120. Furthermore, the input/output module 30 is configured for storing a new password of the BIOS into the CMOS RAM 10, and for copying the new password of the BIOS from the CMOS RAM 10 into the password storing region 122 when the new password has been stored into the CMOS RAM 10.

The determining module 32 is configured for prompting a selection box with two options Y and N—the user interface to record whether the current password of the BIOS needs to be changed. In other words, the user selects option N if the current password of the BIOS needs not be changed, otherwise, the user selects option Y. Furthermore, the determining module 32 is also configured for prompting another selection box with two options Y and N—the user interface to record whether to enable a password verifying mode in which a verifying password is verified by the current password. In other words, the user selects option N if the option is not to enable the password verifying mode, otherwise, the user selects option Y. In addition, the determining module 32 is configured for determining whether a verifying password inputted by the user is valid.

The comparison module 34 is configured for prompting an input box—the user interface to input a verifying password. The comparison module 34 is further configured for comparing the current password stored in the CMOS RAM 10 with the verifying password inputted by the user, and returning a comparison result.

The determining module 32 is configured for determining whether the verifying password inputted by the user is valid according to the comparison result returned by the comparison module 34. The verifying password inputted by the user is valid if the verifying password inputted by the user is the same as the current password stored in the CMOS RAM 10, otherwise, the verifying password inputted by the user is invalid. In other words, the determining module 32 is configured for determining whether the verifying password inputted by the user matches the current password stored in the CMOS RAM 10.

The setting module 36 is configured for prompting another input box—a user interface to set a new password of the BIOS by the user.

Figure 3:
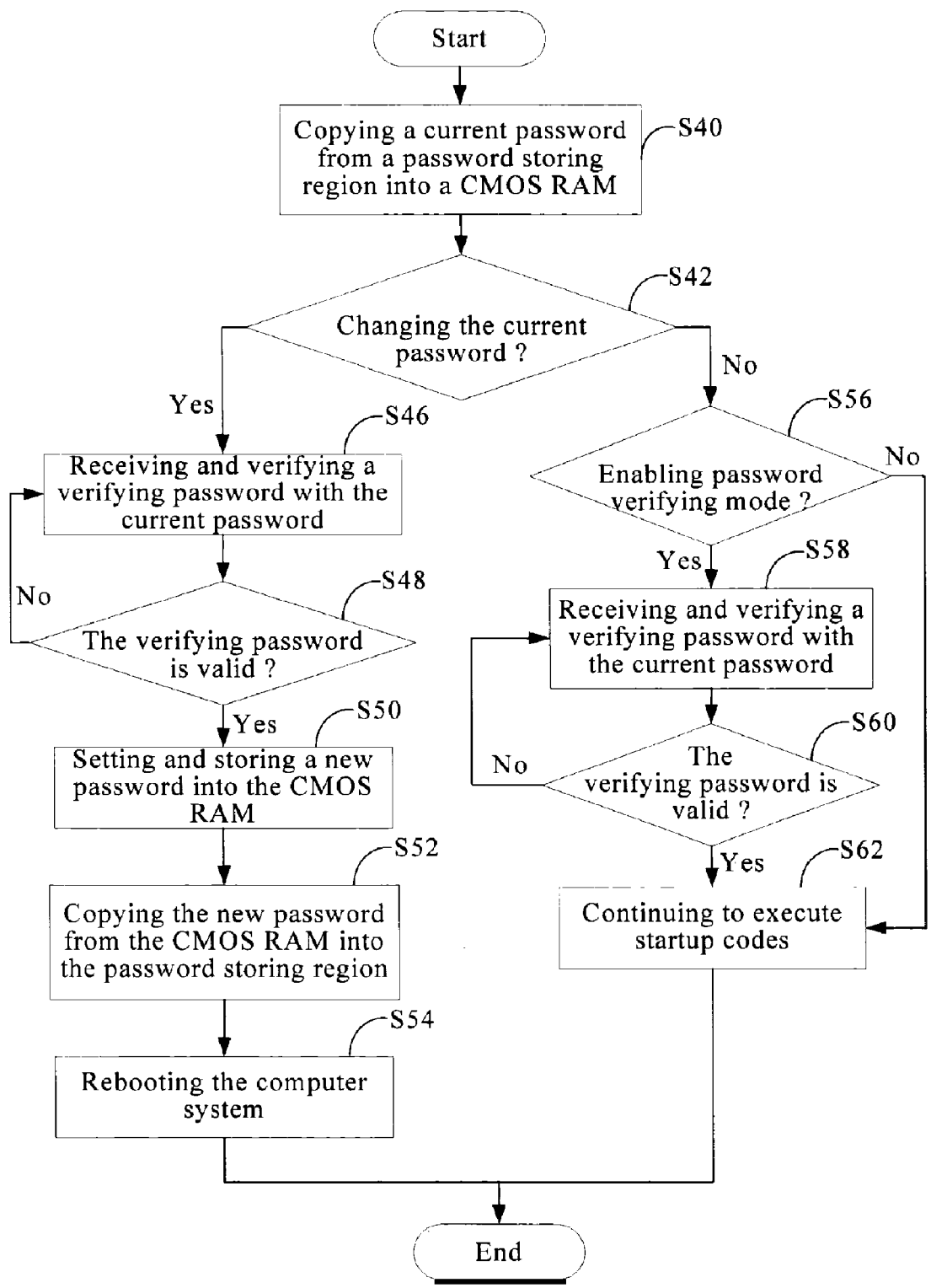
FIG. 3 is a flowchart of a method for protecting a BIOS from unauthorized modifications in accordance with a preferred embodiment.

FIG. 3 is a flowchart of a method for protecting the BIOS from unauthorized modifications in accordance with a preferred embodiment. In step S40, the user boots the computer 1. The CPU 14 of the computer 1 invokes and executes the startup codes stored in the BIOS storing region 120 and activates the input/output module 30 in the computer 1. The input/output module 30 copies the current password of the BIOS stored in the password storing region 122 and stores the copied current password into the CMOS RAM 10. In step S42, the CPU 14 activates the determining module 32. The determining module 32 prompts the change password selection box with two options Y and N—the user interface to record whether the current password of the BIOS needs to be changed. If the current password of the BIOS needs to be changed, in step S46, the CPU 14 activates the comparison module 34. The comparison module 34 prompts the password input box—the user interface to input a verifying password. The comparison module 34 further compares the current password stored in the CMOS RAM 10 with the verifying password inputted by the user, and returns a comparison result A.

In step S48, the determining module 32 determines whether the verifying password inputted by the user is valid according to the comparison result A. If the verifying password inputted by the user is valid, in step S50, the CPU 14 activates the setting module 36. The setting module 36 prompts the new password input box—the user interface to set the new password of the BIOS, and the input/output module 30 stores the new password into the CMOS RAM 10. Otherwise, if the verifying password inputted by the user is invalid, the procedure returns to step S46 described above. In step S52, the input/output module 30 copies the new password from the CMOS RAM 10 into the password storing region 122. In step S54, the CPU 14 invokes and executes the reboot codes for rebooting the computer 1.

Otherwise, if the current password of the BIOS needs not be changed, in step S56, the determining module 32 prompts the access selection box with two options Y and N—the user interface to record whether to enable the password verifying mode in which a verifying password is verified by the current password. If the option is to enable the password verifying mode, in step S58, the comparison module 34 prompts the password input box—the user interface to input a verifying password.

The comparison module 34 further compares the current password stored in the CMOS RAM 10 with the verifying password inputted by the user, and returns the comparison result A. Otherwise, if the option is not to enable the password verifying mode, in step S62, the CPU 14 continues to execute the startup codes. In step S60, the determining module 32 determines whether the verifying password inputted by the user is valid according to the comparison result A. If the verifying password inputted by the user is valid, the procedure goes directly to step S62 described above. If the verifying password inputted by the user is invalid, the procedure returns to step S58 described above.

It should be emphasized that the above-described embodiments of the preferred embodiments, particularly, any "preferred" embodiments, are merely possible examples of implementations, merely set forth for a clear understanding of the principles of the invention. Many variations and modifications may be made to the above-described preferred embodiment(s) without departing substantially from the spirit and principles of the invention. All such modifications and variations are intended to be included herein within the scope of this disclosure and the above-described preferred embodiment(s) and protected by the following claims.

What is claimed is:

1. A system for protecting a BIOS from unauthorized modifications, the system comprising:
   a complementary metal-oxide-semiconductor transistor random access memory (CMOS RAM) configured for storing a password of the BIOS;
   a password storing region configured for storing the password of the BIOS; and
   a BIOS storing region configured for storing the BIOS codes and a password protecting program, the password protecting program comprising:
   an input/output module configured for copying a first password of the BIOS from the password storing region into the CMOS RAM when the BIOS codes are invoked and executed, and configured for copying a new password of the BIOS from the CMOS RAM into the password storing region when the first password in the CMOS RAM is changed to the new password;
   a determining module configured for receiving a first instruction that determines whether the first password of the BIOS needs to be changed, and receiving a second instruction that determines whether to enable a password verifying mode in which a verifying password is verified by the first password;
   a comparison module configured for receiving a verifying password inputted by a user, comparing the first password with the verifying password, and returning a comparison result; and a setting module configured for setting a new password of the BIOS.

2. The system as claimed in claim 1, wherein the input/output module is further configured for storing the new password into the CMOS RAM.

3. The system as claimed in claim 2, wherein the determining module is further configured for determining whether the verifying password is valid according to the comparison result.

4. A method for protecting a BIOS from unauthorized modifications, the method comprising the steps of:
  providing a password storing region configured for storing a first password of the BIOS;
  copying the first password from the password storing region into a CMOS RAM when BIOS codes are invoked and executed;
  determining whether the first password of the BIOS needs to be changed;
  receiving and verifying a verifying password inputted by a user with the first password for preventing an unauthorized user to change the first password if the first password needs to be changed;
  setting a new password of the BIOS if the verifying password is valid, and storing the new password into the CMOS RAM;
  copying the new password from the CMOS RAM into the password storing region.

5. The method as claimed in claim 4, further comprising the steps of:
  determining whether to enable a password verifying mode in which a verifying password is verified by the first password if the first password of the BIOS needs not to be changed; and
  receiving and verifying a verifying password inputted by the user with the first password if to enable the password verifying mode.

* * * * *